United States Patent [19]
Feigel et al.

[11] Patent Number: 5,713,640
[45] Date of Patent: Feb. 3, 1998

[54] HYDRAULIC BRAKING SYSTEM WITH AN AUXILIARY PRESSURE SOURCE HAVING A QUICK FILL CHAMBER

[75] Inventors: Hans-Jorg Feigel, Rosbach; Ulrich Neumann, Robdorf; Lothar Schiel, Hofheim, all of Germany

[73] Assignee: ITT Automotive Europe GmbH, Germany

[21] Appl. No.: 693,185

[22] PCT Filed: Jan. 7, 1995

[86] PCT No.: PCT/EP95/00055

§ 371 Date: Jul. 22, 1996

§ 102(e) Date: Jul. 22, 1996

[87] PCT Pub. No.: WO95/19901

PCT Pub. Date: Jul. 27, 1995

[30] Foreign Application Priority Data

Jan. 20, 1994 [DE] Germany .................. 44 01 524.0

[51] Int. Cl.$^6$ ............... B60T 8/40; H02P 7/05; F04B 5/00
[52] U.S. Cl. ............... 303/115.2; 303/115.4; 60/545; 60/578
[58] Field of Search ............... 303/10, 11, 139, 303/158, 162, 113.2, 113.3–113.4, 114.1–114.2, 116.4, 119.2, 115.1–115.2, 115.4–115.5, 116.1, 116.2; 60/545, 578, 534

[56] References Cited

U.S. PATENT DOCUMENTS

| | | | |
|---|---|---|---|
| 5,123,717 | 6/1992 | Willmann | 303/115.4 X |
| 5,143,429 | 9/1992 | Higashimata et al. | 303/119.2 X |
| 5,161,865 | 11/1992 | Higashimata et al. | 303/115.2 |
| 5,328,257 | 7/1994 | Tsukamoto | 303/115.2 |
| 5,345,766 | 9/1994 | Leonhartsberger et al. | 60/545 |
| 5,433,514 | 7/1995 | Tsukamoto et al. | 303/115.2 X |

FOREIGN PATENT DOCUMENTS

| | | |
|---|---|---|
| 0317182 | 5/1989 | European Pat. Off. . |
| 0317304 | 5/1989 | European Pat. Off. . |
| 0379329 | 7/1990 | European Pat. Off. . |
| 222024 | 9/1942 | France . |
| 4310061 | 9/1994 | Germany . |
| 2174161 | 10/1986 | United Kingdom . |
| 4022699 | 10/1994 | WIPO ............ 303/115.2 |
| WO9519901 | 7/1995 | WIPO . |

OTHER PUBLICATIONS

English Translation of the International Preliminary Examination Report for PCT/EP95/00055.
Patent Abstracts of Japan vol. 9, No. 46(M-360) (1769) Feb. 27, 1985.

*Primary Examiner*—Josie Ballato
*Attorney, Agent, or Firm*—J. Gordon Lewis; Thomas N. Twomey

[57] ABSTRACT

Hydraulic braking system with slip control, comprises a working piston guided within the brake pressure generator, a booster piston of a hydraulic brake force booster for actuating the working piston, at least one wheel brake connected to the brake pressure generator and an electrically operable auxiliary pressure source adapted to be connected to the brake force booster, a control and regulating electronic unit for detecting the wheel rotating pattern and for controlling the wheel brake pressure by means of pressure modulating valves, and an electronic sensor means for detecting the relative movement between the push rod and the booster piston, the output signals of which sensor means are capable of influencing the operation of the auxiliary pressure source, wherein the auxiliary pressure source includes a quick-fill piston which is guided within a servo cylinder arranged on a servo drive.

5 Claims, 1 Drawing Sheet

HYDRAULIC BRAKING SYSTEM WITH AN AUXILIARY PRESSURE SOURCE HAVING A QUICK FILL CHAMBER

TECHNICAL FIELD

The present invention relates to a hydraulic braking system with slip control.

It has shown in the braking system described in German patent application serial number P4310061.9 that on quick operation of the brake, the brake force booster still does not fully satisfy the requirement to furnish a maximum possible fluid volume flow in the initial mode of braking. Also, high pressure and a small fluid volume flow is desirable in a subsequent braking mode.

The generic European patent application No. 0 379 329 discloses a hydraulic braking system with slip control which includes a brake pressure generator having a booster piston to actuate a working piston. The booster piston is acted upon by servo pressure from an electrically operable auxiliary pressure source. To this end, a sensor is provided for detecting the relative movement between a push rod and the booster piston and driving solenoid valves to actuate the auxiliary pressure source by way of a control and regulating electronic unit.

Thus, an object of the present invention is to improve upon a braking system of the previously mentioned type to such effect that the mentioned shortcomings are overcome and a maximum possible fluid volume is furnished to the wheel brakes in the mode of quick initial braking.

The desired fluid volume needed during the initial braking mode can be provided either by using an electrically operable filling stage or a reluctance motor acting as a servo drive and having two differently steep rotational speed/torque characteristic curves.

The features set out in the dependent claims provide advantageous embodiments of the present invention which, in conjunction with the other features and advantages of the invention, will be described and explained hereinafter in greater detail with reference to the accompanying drawing.

DETAILED DESCRIPTION OF THE PREFERRED EMBODIMENT

Figure 1:
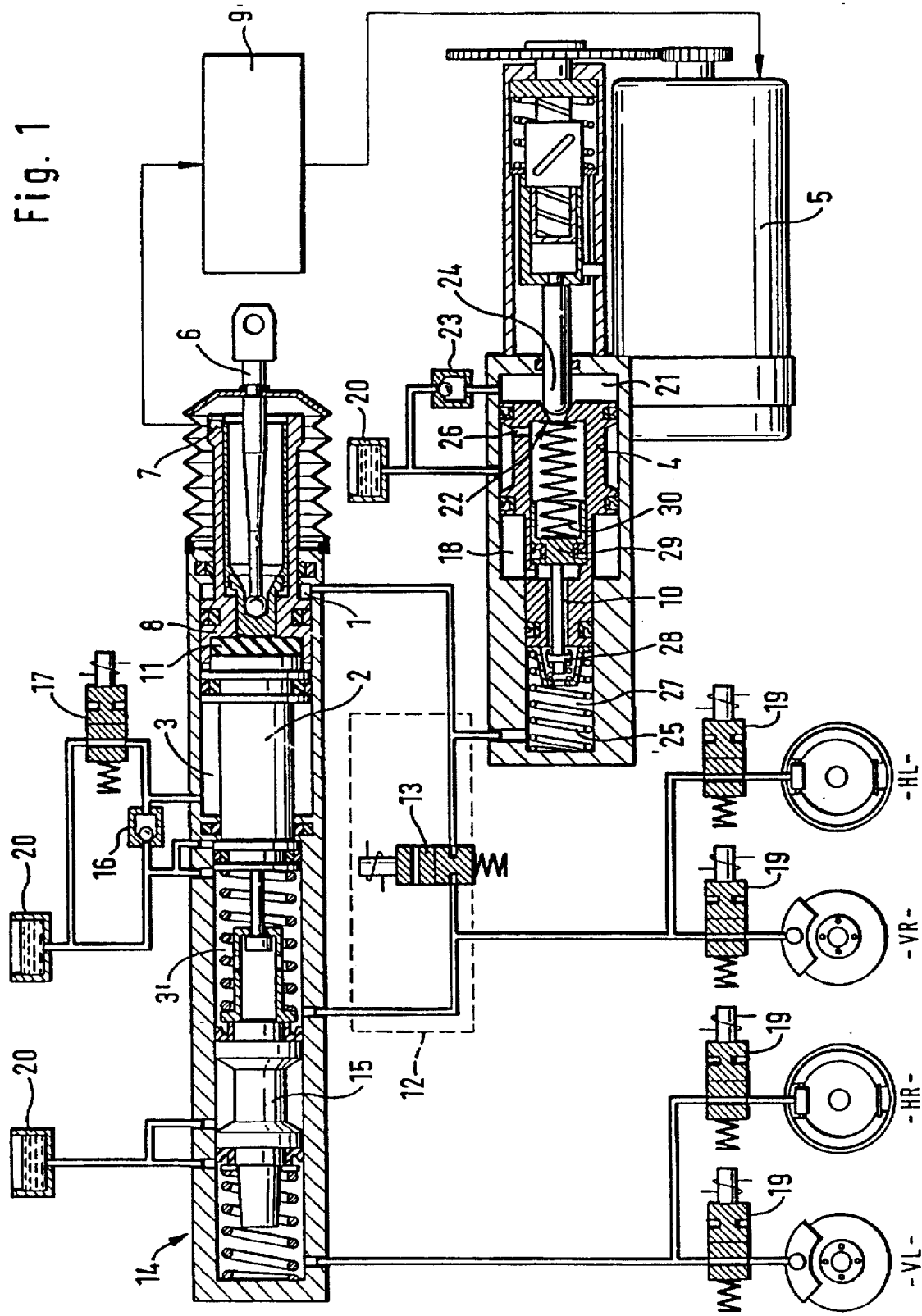
FIG. 1 is a structurally simplified view of one embodiment of the present invention.

The braking system has a diagonal brake circuit allotment. The housing of brake pressure generator 14 accommodates two working pistons 2,15 in tandem arrangement which are operable by means of a push rod 6 guided within a booster piston 8. A first working piston 2, which is provided as a stepped piston and is movable into abutment on the booster piston 8 and the push rod 6, is arranged with its stem within a first pressure chamber of the brake pressure generator 14. The first pressure chamber is subdivided into a chamber 3 and a booster chamber 1 accommodating the booster piston 8. The booster chamber 1 is connectable to another chamber 3' housing another working piston 15 by way of a valve arrangement and, hence, a hydraulic switching arrangement 12.

Further, an auxiliary pressure source including a servo drive 5 and a quick-fill piston 4 is connected to the switching arrangement 12. The push rod 6 is guided within a sleeve-type piston portion of the booster piston 8. The booster piston 8 includes seals both on the sleeve-type piston portion and on the expanded booster piston so as to ensure leakage-free sealing of the booster chamber 1. To the effect of a reaction delaying characteristic improving the feeling for a manual actuation, the brake pressure input is performed by way of a rubber reaction disk 11 embedded between the booster piston 8 and the working piston 2. The push rod actuation is detected by a sensor means 7, for example, by means of a Hall-type sensor and a permanent magnet, by way of electronic processing of the output signals of the sensor in the control and regulating electronic unit 9, with the requirement of a separate electronic unit being eliminated when the processing of the output signals is effected within the control and regulating electronic unit 9 provided for the ABS/TSC braking operation.

The positioning sensor of the sensor means 7 according to the present embodiment is located in the area between the booster piston 8 and the sleeve of push rod 6. The signal of movement detected by the positioning sensor is evaluated by the peripherally arranged control and regulating electronic unit 9 which, in case of a control deviation, will activate the quick-fill piston 4. With respect to the reliability and safety of the braking system, the control and regulating electronic unit 9 and the sensor means 7, preferably, are of a redundant design. Not only does the electronic unit perform the control and regulation of the brake force booster function but can, in case of need, equally perform the anti-lock control and traction slip control functions due to the suggested hydraulic switching arrangement 12. In place of a multiplicity of driving means, the present invention suggests using an electric rotary drive, designed as a spindle drive, as the servo drive 5 for the quick-fill piston 4.

The rotary drive is of a non-self-locking design to ensure an unimpeded restoring movement of the quick-fill piston 4. The servo drive 5 involves a high efficiency and a compact and light design. However, if desired or required, vacuum, compressed air and hydraulic drives can be used by way of alternative. Pneumatic linear drives having electrically actuatable valves and electric drives have proved to be particularly suitable. To keep the thermal and electric load on the servo drive 5 as low as possible, a locking means is provided for maintaining a holding force. A liquid-filled, lockable pressure chamber 21 is particularly suitable for this purpose. The pressure chamber 21 is provided immediately behind the quick-fill piston 4 and can be connected to the intake reservoir 20 by way of a non-return valve 23 and a closure member 24 provided on the servo drive 5 and acting upon the quick-fill piston 4. The servo drive 5 has a reversal of the direction of rotation in order to establish, if need be, the pressure fluid connection between the pressure chamber 21 and the intake reservoir 20 through a passageway within the quick-fill piston 4.

With the smaller one of the two cross-sections, the quick-fill piston 4 confines a modulator chamber 27 within the servo cylinder which is coupled to an electric motor by a spindle drive and a reduction gear preceding the spindle drive. The large cross-section of the quick-fill piston 4 accommodates in its interior a control piston 29 including a compression spring 30. By way of an annular duct 10 which extends through the small cross-section of piston 4, control piston 29 is in contact with a central valve 28 that controls the pressure fluid passage between the modulator chamber 27 and the quick-fill chamber 18. Quick-fill chamber 18, configured as an annular chamber in the servo cylinder, is confined by the peripheral surface at the small piston cross-section and the end surface at the large piston cross-section so that pressure fluid can propagate between the quick-fill chamber 18 and the modulator chamber 27 depending on the direction of stroke of the quick-fill piston 4.

Spring 25, which is arranged in the modulator chamber 27 and abuts on the small cross-section of the quick-fill piston 4, causes the resetting movement of the quick-fill piston 4 in the direction of closure member 24 (isolating the channel 26 from the pressure chamber 21) during braking pressure reduction and, thus, also in the position of brake release. Closure member 24 along with a through-bore in the end surface of the quick-fill piston 4, forms the outlet valve 22 being part of the pressure fluid connection to the intake reservoir 20. The movement of the central valve 28 closing the annular duct 10 takes place as a function of the pressure in the quick-fill chamber 18 as soon as the pressure fluid volume displaced from the quick-fill chamber 18 in the direction of the modulator chamber 27 exceeds the resetting force which mainly includes the force of the compression spring 30 on the control piston 29. Subsequently, the control piston 29 moves away from the tappet of the central valve 28 in the direction of the compression spring 30.

The pressure fluid volume in the interior of the large piston step may escape to the intake reservoir 20 through the passageway 26. Both the small piston portion and the large piston portion of the filling stage extend in the direction of the modulator chamber 27 or the quick-fill chamber 18 and pressure chamber 21 and are fluid-tightly sealed by cup seals. In addition, the control piston 29 has a cup seal acting in the direction of the quick-fill chamber 18.

The brake power booster in the proposed braking system is uncoupled mechanically from the filling stage, thereby avoiding undesirable reactions to the brake pedal. Upon quick braking operations, the quick-fill piston furnishes the wheel brakes with a relatively large pre-charging volume and, during subsequent braking operations, provides a high braking pressure with a decreased volume flow due to the pressure-responsive control of the quick-fill chamber 18. The servo drive 5 causes movement of the quick-fill piston 4 in the direction of the modulator chamber 27.

Initially, in the first mode of quick braking operations, the central valve 28 is open until a defined pressure is applied to the end surface of the control piston 29. This pressure moves the control piston 29 in opposition to the direction of movement of the quick-fill piston 4. The result is that the central valve 28 closes the annular duct 10 and, thus, on subsequent braking operations, the desired high pressure is achieved, with a decreased volume flow to the brake pressure generator 14 (due to the reduced displacement effect of the small cross-section of the quick-fill piston 4).

According to another embodiment of the principle of the present invention, a sensor is provided for measuring the position of the quick-fill piston or spindle. Moreover, by using a sensor for detecting the pivot angle of the electric rotary motor, the pressure prevailing in the braking system can be concluded from the actuating characteristic of the servo drive, which favors the brake pressure control. A sensor for detecting the electric power taken up by the servo drive 5 could be suitably used for this purpose.

The operation of the braking system according to the present invention will now be described. All elements shown in FIG. 1 are associated with the brake releasing position. The standard braking function is performed in a known per se manner by manually actuating the push rod 6. The movement of the push rod 6 is detected by the sensor means 7 and is monitored within the control and regulating electronic unit 9 on the basis of the nominal data. Below the permitted wheel slip threshold, the shut-off valve 13 comprised in the hydraulic switching arrangement 12 remains electrically de-energized, with the servo drive 5 and the quick-fill piston 4 being activated in case of a control deviation from the nominal data of the desired booster characteristic.

With the servo drive inactivated, first a mechanical through-drive is provided as in a conventional braking system. As a result of the sensor signal evaluation in the control and regulating electronic unit 9, the hydraulic booster function is electrohydraulically varied, according to the requirements, by way of the variable for the servo drive 5. To that extent, the pressure fluid volume directly fed into the booster chamber 1 by the quick-fill piston 4 has the desired booster pressure. Reducing the booster pressure is effected by a reversal process of the servo drive 5, thereby pressure-relieving the quick-fill piston 4. In the preferred embodiment, this is effected by a reversal of the direction of rotation of the spindle motor, thereby causing the conical closure member 24 acting on the spindle drive as a shut-off valve 22 to reduce the holding force respectively effective in the pressure chamber 21 by the pressure fluid flowing back to the intake reservoir 20 through a passageway 26 provided in the quick-fill piston 4.

The quick-fill piston 4, under the action of spring 25, can thus move backward, resulting in an enhanced volume take-up in the modulator chamber 27. Thus, the central valve 28 remains in the switching position releasing the annular duct 10.

When the control and regulating electronic unit 9 identifies excessively high brake slip values in the operating brake position by means of additional sensors for detecting the wheel speed, the brake pressure modulation (anti-lock control mode) characterized by pressure maintaining, pressure decreasing and pressure increasing modes is activated. For filtering out disturbance variables and for generating the pressure maintaining function in both brake circuit diagonals, the normally open inlet valve 17 connected to the intake reservoir 20 is electromagnetically closed, thereby causing the pressure fluid volume enclosed in chamber 3 to hydraulically lock the push rod 6 and, hence, to limit the instantaneously introduced manual brake force actuation. During that time, the shut-off valve 13 and the quick-fill piston 4 remain unaffected by this measure in the inactive position as shown.

For initiating the pressure decreasing mode, with the inlet valve 17 still closed, the shut-off valve 13 opens the hydraulic connection of the brake circuit normally in communication with the chamber 3' toward the booster chamber 1 and the quick-fill piston 4. By pressure-relieving the chamber 3' the working piston 15 is at the same time pressure-relieved so that in the connected brake circuit the pressure toward the intake reservoir 20 fitted to the brake pressure generator can be reduced. The hydraulic pressure of the other brake circuit directly connected to the switching arrangement 12 escapes during the pressure decreasing mode into the expanded modulator chamber 27. This pressure reduction is caused as a result of the reversal process initiated by the servo drive 5, wherein the closure member 24 on the spindle drive causes the pressure fluid to flow back from the pressure chamber 21 through the passageway 26 to the intake reservoir 20.

The central valve 28 guided in the small cross-section of the quick-fill piston 4 is in its open position so that the modulator chamber 27 is connected to the quick-fill chamber 18 by way of an annular duct 10. The resetting movement of the quick-fill piston 4 automatically causes an increase in the quick-fill chamber 18. The switching point of the central valve 28 is thereby determined pressure-responsively as a function of the difference in pressure of the pressurized surface on control piston 29 guided on the quick-fill piston 4. The actuating force (pedal force) manually fed through the push rod 6 to the working piston 2 is ineffective due to the blocking position of the inlet valve 17 and, hence due to the blocking of chamber 3.

The wheel-specific control of the brake pressure variation in the wheel brakes VR, VL, HR, HL is by electromagnetically actuatable 2-way/2-position valves 19 open in their de-energized condition. These valves, during the pressure maintaining mode, are electromagnetically switched to the blocking position and, during the pressure increasing and pressure decreasing modes, are in the electromagnetically de-energized open basic position. In the anti-lock control mode, the pressure variation in the wheel brakes is dependent on the way of operation of the inlet valve 17 and the shut-off valve 13 as well as on the activation of the quick-fill piston 4.

With respect to the rear axle brakes HL, HR, it is to be concluded that in the pressure decreasing mode both rear wheel brakes are pressure-relieved by closing the inlet valve 17 (working piston 2, booster piston 1 are hydraulically blocked) and by opening the shut-off valve 13, as soon as the quick-fill piston 4 performs a reset movement. Pressure fluid is withdrawn directly from the booster chamber 1, the chamber 3' of the working cylinder 15, and from the rear wheel brake HR of the push rod brake circuit.

For realizing the pressure increasing mode in the two rear wheel brakes, the pressure fluid volume displaced from the modulator chamber 27 by the quick-fill piston 4, through the open shut-off valve 13 is fed both into the push rod brake circuit and into the chamber 3' required for the hydraulic actuation of the other working piston 15. Upon completion of the manually initiated brake actuating mode, the switching modes of the inlet and shut-off valves 17, 13 will reverse so that the valves are restored to their original basic position.

For safety reasons, a non-return valve 16 opening toward the chamber 3 is arranged in parallel to the inlet valve 17 in order to enable, in all circumstances, a manually controlled pressure relief of the wheel brakes to be effected if the inlet valve 17 is jammed in the blocking position.

The switching arrangement of the braking system according to the present invention as shown in FIG. 1 not only is suitable for performing a brake force booster function adaptive to the characteristic field and for use as a brake slip control system but is also suitable for controlling the traction slip in that the brake actuating pressure prevailing in the wheel brakes of the driven vehicle wheels can be determined, without any special efforts, by electronically actuating the servo drive 5. In such an arrangement, additional electromagnetically operable shut-off valves are provided in the brake conduit branches of the non-driven vehicle wheels (not expressly shown in FIG. 1). Consequently, in the traction slip control mode, pressure is hydraulically applied to the working piston 2 and the booster piston 8 by activating the servo drive 5. The inlet valve 17 remains opened, while the shut-off valve 13 remains closed. Pressure fluid from the modulator chamber 27 is exclusively passed into the booster chamber 1 so that the pressure required for the traction slip control can act upon the two working pistons 2,15. Therefore, on the wheel brakes of the driven vehicle wheels can be controlled individually for each wheel by way of two-way/two-position valves 19, while the wheel brakes of the non-driven vehicle wheels are separated from the pressure control by preferably electromagnetically operable way-valves (shut-off valves).

What is claimed is:

1. A hydraulic braking system with slip control comprising:

at least one working piston guided within a brake pressure generator, a booster piston of a hydraulic brake force booster for actuating said working piston, at least one wheel brake connected to said brake pressure generator, an electrically actuatable auxiliary pressure source connectable to said brake force booster, a control and regulating electronic unit for detecting a wheel rotating pattern and for controlling a wheel brake pressure by means of pressure modulating valves, wherein an electronic sensor means is provided for detecting a relative movement between a push rod and said booster piston, said sensor means outputting signals capable of controlling the operation of said auxiliary pressure source, said auxiliary pressure source including a quick-fill piston inside a servo cylinder which is operated by an electrically drivable servo drive, said quick-fill piston being made with two cross-sections, a smaller one of said two cross-sections defining a modulator chamber within said servo cylinder which is connectable to said brake pressure generator and said at least one wheel brake by way of a hydraulic switching arrangement, and a larger cross-section of said quick-fill piston confining a quick-fill chamber inside said servo cylinder which is connectable to said modulator chamber by way of an annular duct.

2. The hydraulic braking system as claimed in claim 1, wherein the quick-fill piston houses a control piston which is acted upon by a compression spring and is movable into abutment on a central valve that controls a pressure fluid passage in the annular duct.

3. The hydraulic braking system as claimed in claim 1, further including a fluid-filled closable pressure chamber that forms a locking means on an end surface of the quick-fill piston remote from the quick-fill chamber.

4. The hydraulic braking system as claimed in claim 3, further including a passageway in the quick-fill piston, that is controllable by a shut-off valve, and establishes a hydraulic connection between the pressure chamber and an intake reservoir, and a control piston is exposed to a balancing pressure between the pressure chamber and the intake reservoir and a permanently acting compression spring.

5. The hydraulic braking system as claimed in claim 4, wherein a controlling force of a compression spring is smaller than a controlling force of the spring in the modulator chamber.

* * * * *